United States Patent [19]

Walz

[11] 4,073,094

[45] Feb. 14, 1978

[54] METHOD AND APPARATUS FOR REPAIRING A CRACK IN A PANE OF PLATE GLASS

[76] Inventor: Robert A. Walz, 217 Enfield Road, Dayton, Ohio 45459

[21] Appl. No.: 802,246

[22] Filed: May 31, 1977

[51] Int. Cl.[2] .............................................. B32B 35/00

[52] U.S. Cl. ................................. 51/111 R; 51/81 R; 51/283 R; 125/20; 156/94; 156/256; 156/293; 156/513; 408/41

[58] Field of Search ............... 30/164.95, 276; 125/20; 51/111 R, 81 R, 283; 408/37, 41; 156/94, 513, 256, 293

[56] References Cited

U.S. PATENT DOCUMENTS

| | | | |
|---|---|---|---|
| 3,162,066 | 12/1964 | Morer et al. | 125/20 |
| 3,494,348 | 2/1970 | Linblad | 125/20 |
| 3,568,367 | 3/1971 | Meyers | 125/20 |
| 3,813,820 | 6/1974 | Highberg et al. | 408/37 |
| 3,851,491 | 12/1974 | Walker | 408/37 |
| 3,986,913 | 10/1976 | Walz | 156/98 |

*Primary Examiner*—Edward G. Whitby

*Attorney, Agent, or Firm*—Biebel, French & Nauman

[57] ABSTRACT

A system for repairing a crack in a pane of plate glass in which a rotatable shaft extends through the glass and carries cutters on both sides for concurrently cutting an aperture therein from both sides.

8 Claims, 8 Drawing Figures

METHOD AND APPARATUS FOR REPAIRING A CRACK IN A PANE OF PLATE GLASS

BACKGROUND OF THE INVENTION

Walz U.S. Pat. No. 3,986,913 of Oct. 19, 1976, discloses means for repairing cracks in plate glass in which a cut is made first from one side of the glass and thereafter from the other.

SUMMARY OF THE INVENTION

In the present invention a repair system is disclosed in which the cutting of the glass in the region of the crack is done concurrently from both sides, thereby speeding up the operation and providing more uniformity in the cut.

DESCRIPTION OF THE PREFERRED EMBODIMENT

Figure 1:
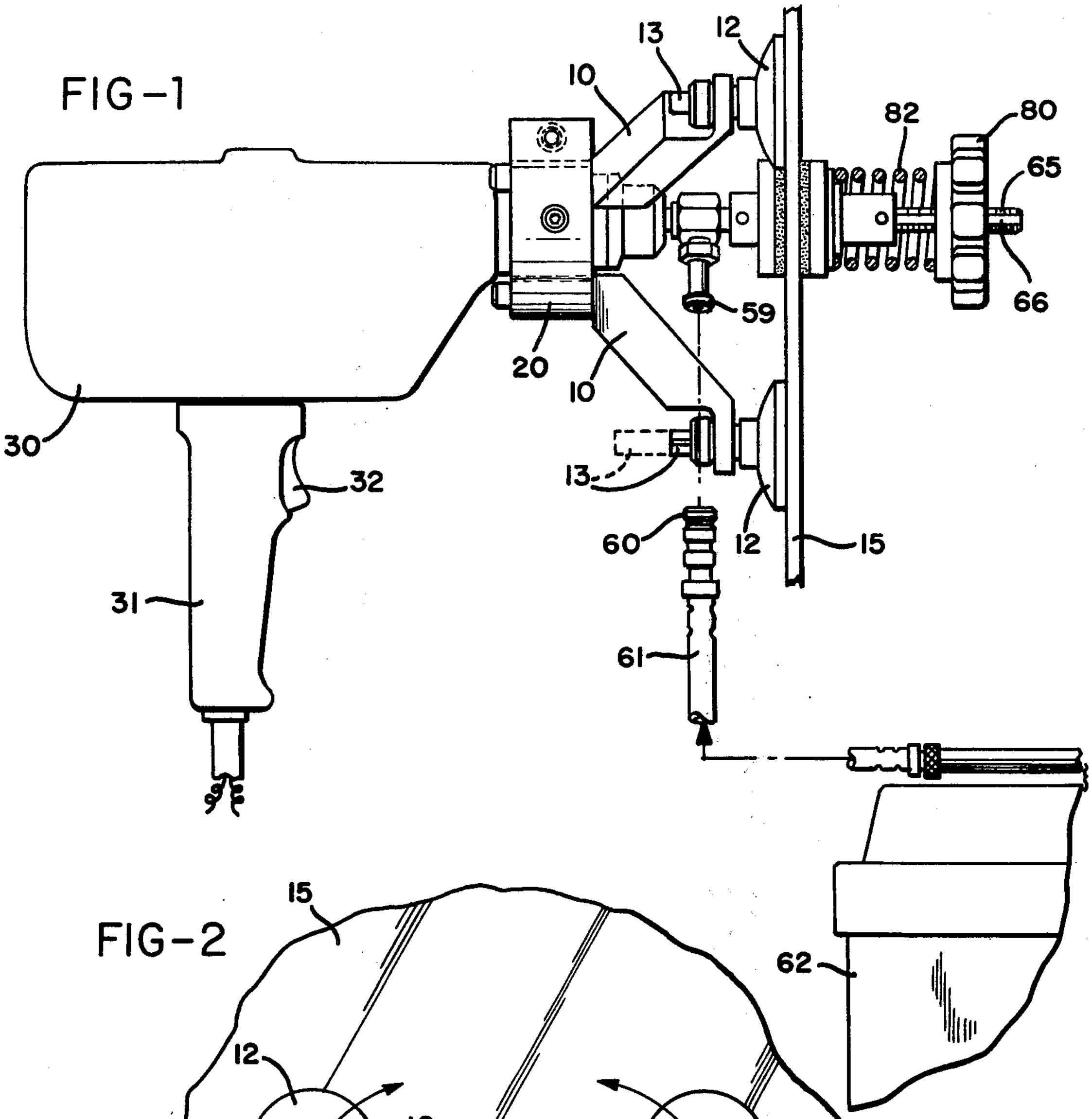
FIG. 1 is a view in elevation of the apparatus used in practicing the present invention.
Figure 2:
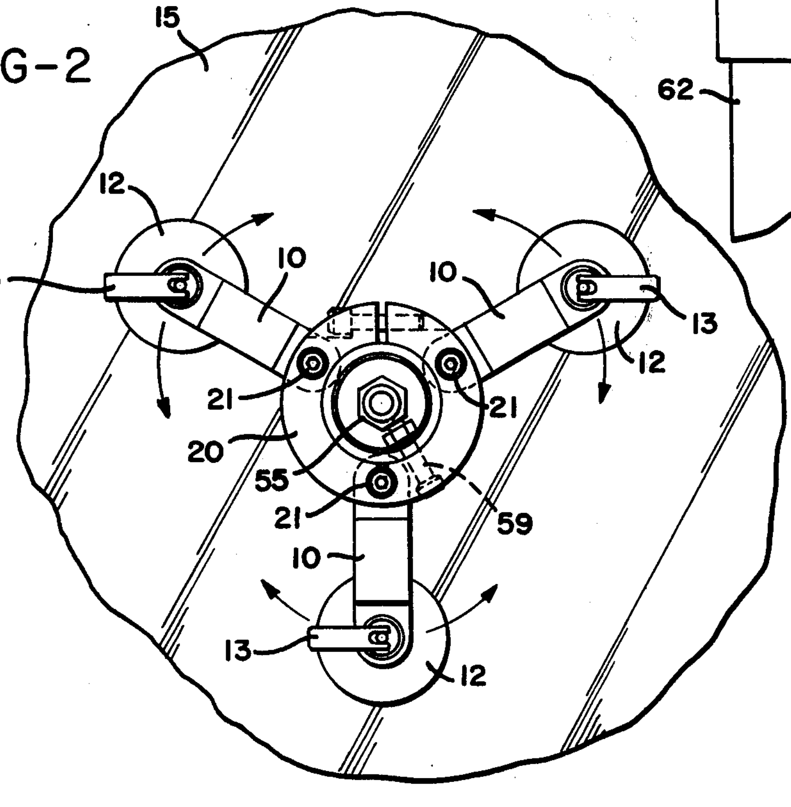
FIG. 2 is a view from one side of the piece of glass showing how the apparatus is mounted thereon prior to the cutting operation.

Referring to FIGS. 1 and 2, the device comprises a three-legged spider 10 having suction cups 12 on each leg which are operable by means of a lever 13 which can be moved to cause the cups to adhere or to release position in which the entire spider may be removed. Preferably each suction cup 12 has a coating of glycerine or the like so that it can be moved over the surface of the glass in order to obtain the proper location of the spider.

The spider is shown as located on the inside of the glass 15 but the terms inside and outside are relative only and in actual practice the power motor device may be either inside or outside of the structure enclosed by the glass.

It will also be understood that the first step in the operation is to form a pilot hole 16 in the glass which is done in the same manner as described in said Walz U.S. Pat. No. 3,986,913.

A clamp ring 20 is supported on the three legs of the spider by bolts 21, the clamp ring being split as shown at 23 and having a clamp bolt 24 so that it can be adjustably positioned as desired. The spider provides for supporting a drive motor and cutter assembly in proper position on the pane of glass and maintaining it in normal relation thereto.

The drive motor is shown at 30 which may be either electrically, hydraulically or pneumatically powdered and which has a hand support 31 with a contro switch 32. The motor has an integral sleeve 35 on which a collar 36 is press-fit. The motor also has a chuck 37 adapted to receive the drive shaft.

The collar 36 is received within the ring 20 and there is a slot 40 on the collar which cooperates with a pin 41 supported in ring 20 to allow the entire motor assembly and driven shaft to move axially but not rotationally relative to ring 20 in order to provide for forward feeding of the cutter during the cutting operation as will be described hereinafter.

The motor shaft is shown at 50 being received in chuck 37 and having a hollow inner part 51 adapted to supply lubricating fluid to the cutters. In order to supply fluid to the shaft there is a gland 55 held in place on the shaft by clip 56 with a supply pipe 58 having a quickly detachable coupling member 59 thereon. This receives a cooperating coupling 60 supplied with fluid through line 61 from pump 62. A suitable lubricating fluid for this purpose is water. Shaft 50 has an elongated extension 65 the outer end of which is threaded and with a slot 66 to receive a pin 68 for driving purposes while allowing movement axially of the shaft.

Figure 3:
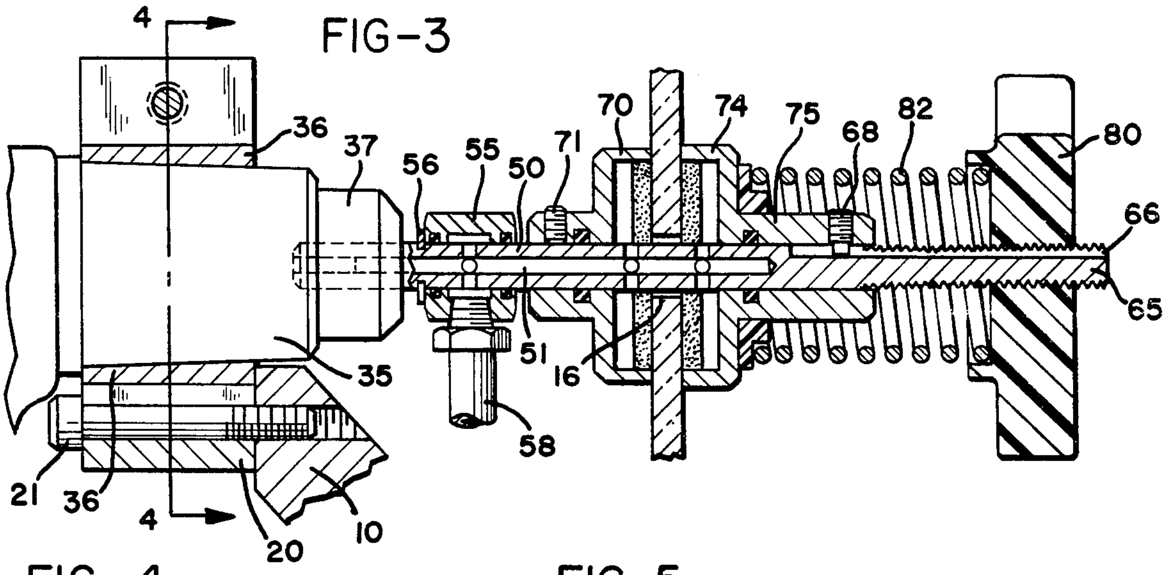
FIG. 3 is a vertical sectional view through the apparatus in cutting position.
Figure 4:
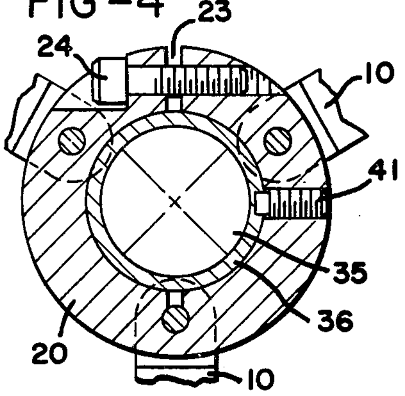
FIG. 4 is a sectional view on the line 4004 of FIG. 3.

An inside cutter 70 is secured to shaft 50 by set screw 71 and an outside cutter 74 having a shank 75 is driven by the shaft extension by means of the pin 68. The hollow shaft passage 51 has suitable ports as shown in FIG. 3 through which the lubricant may be discharged upon the two cutting faces inside and outside the glass.

A hand nut 80 is mounted on the threaded end of shaft 65 through which pressure may be applied to spring 82 fitting against the outside cutter 74. It will also be evident that as the hand nut is tightened, more or less pressure will be applied to urge cutter 74 toward the left as viewed in FIG. 3 against the outside of the glass and at the same time to pull shaft 65 toward the right and thereby urge inside cutter 70 against the inside surface of the glass with substantially the same degree of force. It will be understood that in use the operator supports the drive assembly by hand and may also urge it toward the inside surface of the glass, but the arrangement is such that the pressure exerted by spring 82 will tend to equalize the force applied to the opposed cutters and in practice therefore it will result in cutting substantially equally from both sides at the same time.

Figure 7:
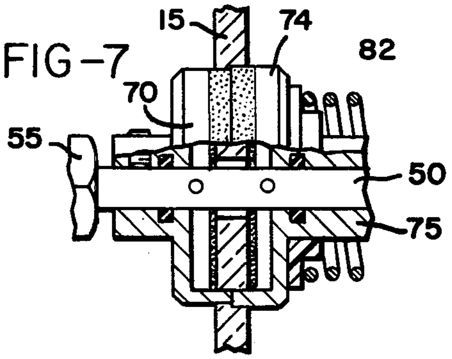
FIG. 7 is a view in section showing the position of the cutters when the cut is finished.
Figure 8:
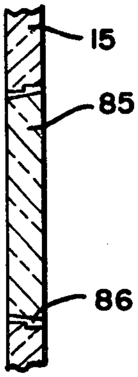
FIG. 8 is a view through the glass showing the positioning of a repair slug in the aperture previously made.

Preferably the outside cutter is slightly larger in diameter than the inside cutter as shown in FIG. 7 which facilitates removal of the device at the end of the cutting operation.

Figure 5:
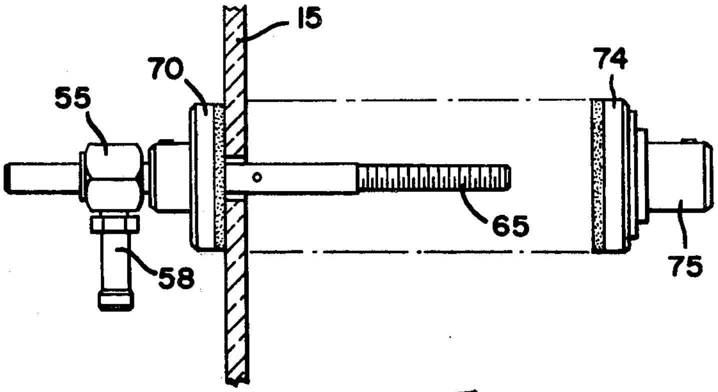
FIG. 5 is a side view showing an initial step in the assembly of the apparatus for performing a cut.
Figure 6:
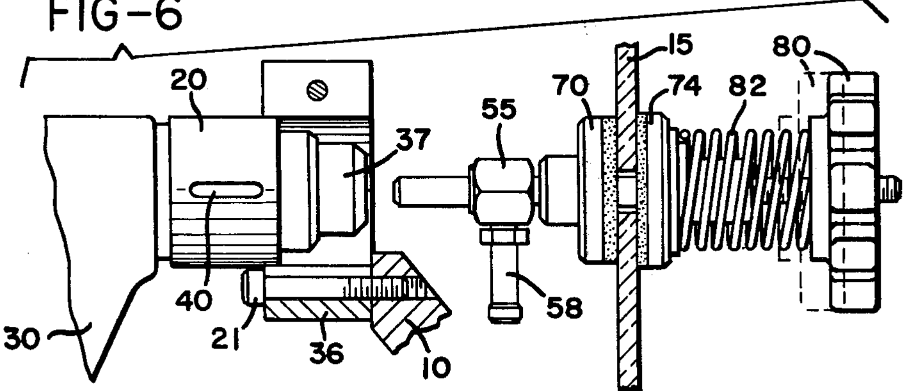
FIG. 6 is a similar view showing a later step in the assembly of the apparatus for cutting.

The parts are assembled in the sequence shown in FIGS. 5 and 6 and a low tension is initially applied by nut 80 to spring 82. With the two cutters thus urged lightly against opposite faces of the glass the motor is operated for a brief period such as 5 seconds, to make sure that all parts are properly aligned and that the lubricant is flowing. The nut 80 is then tightened to apply full cutting pressure and the operation proceeds until the cutting is completed.

When the cut is complete, the load on the motor decreases and it will tend to speed up, thereby allowing the operator to turn off the power, cut off the lubricant, loosen check 37, detach connector 59, remove shaft and cutter assembly, and to disassemble the apparatus and remove the broken slug from the glass. To disassemble, the hand nut 80 is backed off and the spring and the outside cutter removed from the shaft. The shaft still supported in the motor and carrying the inside cutter may then be withdrawn and the final step is the insertion of a new slug 85 in the aperture in which it is secured by means of adhesive of any suitable type shown at 86.

The advantage of the invention is that both cuts are made concurrently and with essentially the same pressure so that a more uniform cutting operation takes place and the repair operation can be performed with a minimum of time required.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. Apparatus for repairing a crack in a pane of plate glass having a pilot hole therethrough comprising a single drive motor having an extended shaft, an inner cutter, an outer cutter, means for mounting said cutters on said shaft on opposite sides of said pane of glass, and means for yieldably urging said cutters into cutting relation with said pane of glass to concurrently cut a section therefrom from opposite sides thereof.

2. Apparatus as set forth in claim 1 including means for applying a cutting fluid to the cutting surfaces of said cutters.

3. Apparatus as defined in claim 1 in which one of said cutters is slightly larger in diameter than the other.

4. Apparatus as defined in claim 1 in which means are provided for detachably supporting said motor in predetermined position upon the face of said glass in normal relation thereto.

5. A method for repairing a crack in a pane of plate glass having a pilot hole therethrough comprising supporting a single drive motor upon the pane of glass in normal relation thereto and with the shaft of the motor extending through the pilot hole, and concurrently cutting the glass from both sides thereof to remove a section therefrom.

6. A method as defined in claim 5 in which a lubricating fluid is applied to the cutting zones.

7. A method as defined in claim 5 in which the diameter of the cutter is slightly larger on one side than on the other.

8. The method of claim 5 in which cutters are yieldably urged against both faces of the glass to cause concurrent cuts to be made therein to allow removal of the cut section of glass therefrom.

* * * * *

Notice of Adverse Decision in Interference

In Interference No. 100,020, involving Patent No. 4,073,094, R. A. Walz, METHOD AND APPARATUS FOR REPAIRING A CRACK IN A PANE OF PLATE GLASS, final judgment adverse to the patentee was rendered June 9, 1981, as to claims 1, 2, 4, 5, 6 and 8.

[*Official Gazette November 3, 1981.*]